INVENTORS
NATHAN PATRUSKY
DELL E. JORGENSEN
BY William R. Lane
ATTORNEY

July 31, 1956  N. PATRUSKY ET AL  2,757,331
THYRATRON POWER AMPLIFIER
Filed Dec. 11, 1951  3 Sheets-Sheet 3

INVENTORS
NATHAN PATRUSKY
BY DELL E. JORGENSEN

*William R. Lane*

ATTORNEY

United States Patent Office 2,757,331
Patented July 31, 1956

2,757,331

THYRATRON POWER AMPLIFIER

Nathan Patrusky, Los Angeles, and Dell E. Jorgensen, Pico, Calif., assignors to North American Aviation, Inc.

Application December 11, 1951, Serial No. 261,058

7 Claims. (Cl. 321—40)

This invention relates to power amplification by the use of thyratrons, and particularly to a circuit utilizing thyratrons whose power output may be used to control the direction and speed of a current-consuming device in response to a low power direct current input.

Thyratrons are to be preferred to ordinary vacuum tubes for supplying power to such devices as motors because of their large power-handling ability. In the past, thyratrons have been used with some success for this purpose. However, because a thyratron is a gas-filled tube, the exact point in time at which it starts to conduct is difficult to control. This property is an inherent characteristic of a thyratron.

This invention contemplates the provision of a circuit in which thyratrons are caused to fire or conduct uniformly at a predetermined time each cycle.

It is therefore an object of this invention to provide an improved thyratron power amplifier.

It is another object of this invention to provide means for accurately controlling the time of firing of a thyratron.

It is another object of this invention to provide means for applying a relatively large current to a load, with a magnitude and direction controllable in response to the magnitude and polarity of a relatively small direct current voltage.

Figure 1:
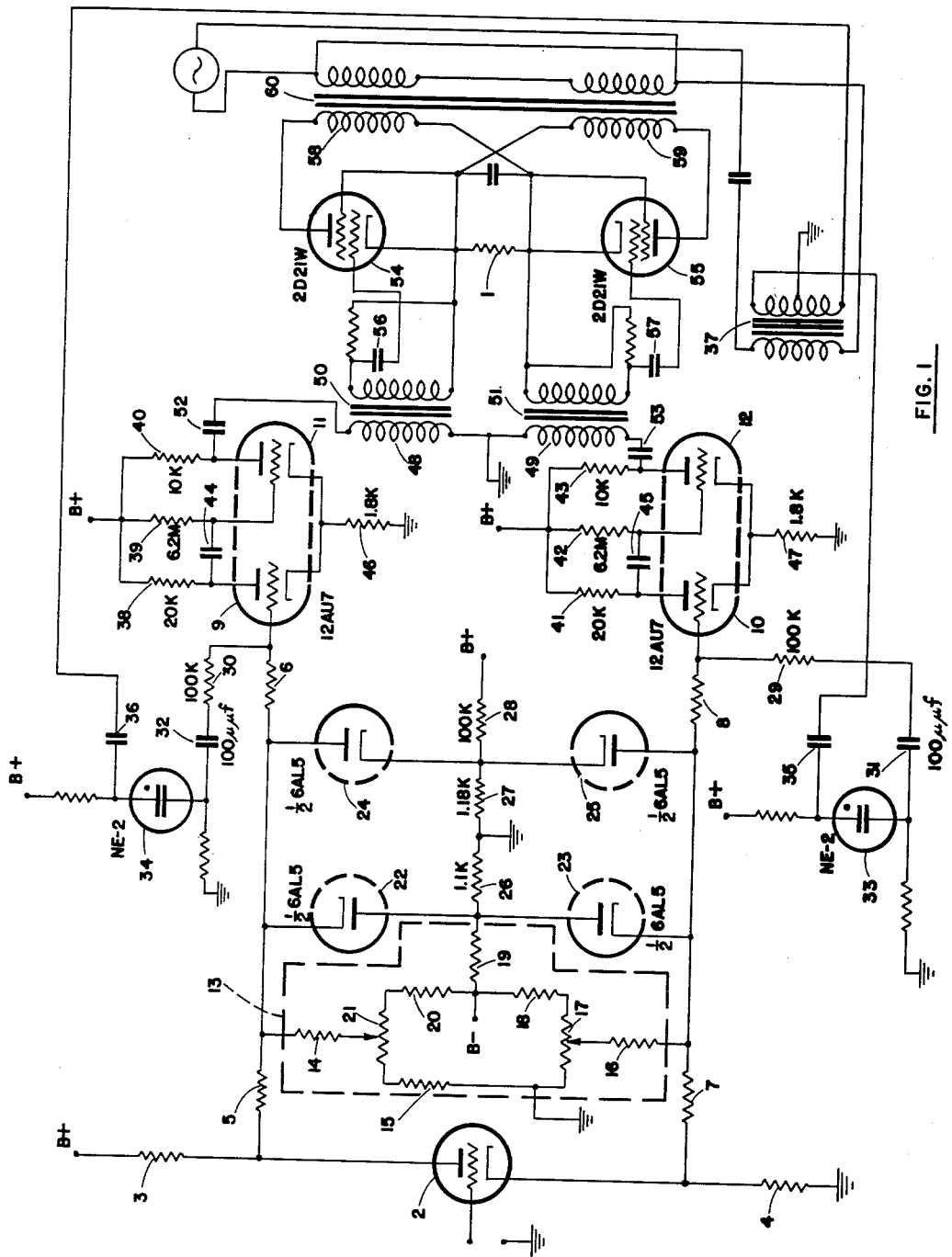

Other objects of invention will become apparent from the following description taken in connection with the accompanying drawings, in which Fig. 1 is a circuit diagram of the invention; and Figs. 2 through 5 are graphs of voltage on various circuit elements of the invention plotted against time.

Referring to Fig. 1, it is desired to produce a current flow in a load 1 which may be a motor or any other device which consumes power, which current flow is controlled in magnitude and direction by the magnitude and polarity, respectively, of the voltage applied to the grid of triode 2. As shown in Fig. 1, the plate of triode 2 is connected to a B power supply of approximately 150 volts through resistance 3, while the cathode of triode 2 is connected to ground through resistance 4. Triode 2 functions as a phase inverter so that for whatever voltage change there is applied to the grid of triode 2, there appears equal and opposite voltage changes upon the plate and cathode, respectively, of triode 2. The plate and cathode of triode 2 are connected through resistances 5, 6, 7, and 8 to the grids of triodes 9 and 10, respectively, which are the first tubes of a pulse width multivibrator of which triodes 11 and 12 are the other triodes. Balance network 13 consisting of resistances 14, 15, 16, 17, 18, 19, 20, and 21 connected as shown in Fig. 1 is provided to assure that the voltage applied to the grid of triode 9 is at all times equal in magnitude and opposite in polarity to the voltage applied to the grid of triode 10. Diodes 22, 23, 24, and 25, and resistances 26, 27, and 28 are provided for the purpose of limiting the extreme values of the voltage applied to the grids of triodes 9 and 10. The grids of triodes 9 and 10 are also connected to a source of 400 cycle pulses through resistances 29 and 30, capacitances 31 and 32, neon tubes 33 and 34, and capacitances 35 and 36—four-hundred cycle power being furnished from transformer 37. B power is supplied to the plates of triodes 9, 10, 11, and 12 through resistances 38, 39, 40, 41, 42, and 43 as shown, with capacitances 44 and 45 connected between the plates of triodes 9 and 10 and the grids of triodes 11 and 12 as shown in Fig. 1. The cathodes of triodes 9, 10, 11, and 12 are connected to ground through resistances 46 and 47, as shown. The plates of triodes 11 and 12 are connected to primary windings 48 and 49 of transformers 50 and 51, in series, through capacitances 52 and 53. The secondaries of transformers 50 and 51 are connected to the cathodes of thyratrons 54 and 55 and to the grids of thyratrons 54 and 55 through resistances 56 and 57. The cathodes of thyratrons 54 and 55 are connected to load 1, and the plates of these thyratrons are connected to secondary windings 58 and 59 of transformer 60, while the primary of transformer 60 is connected to the same source of 400 cycle power as is transformer 37.

Figure 2:
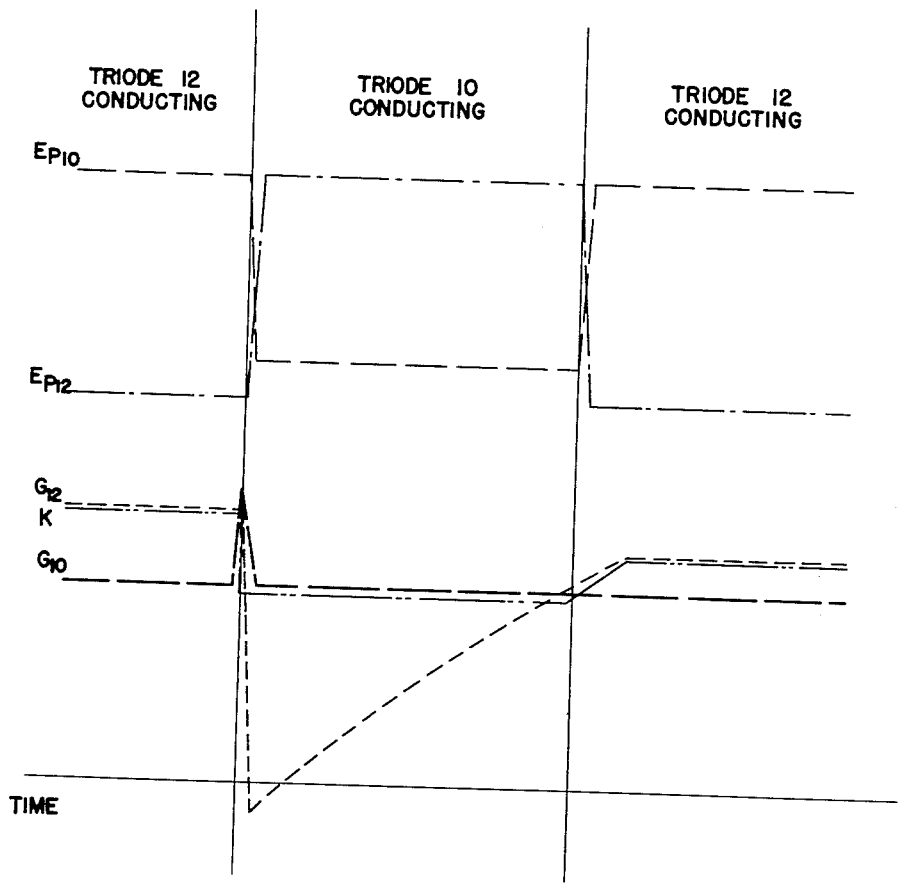

In operation, a direct current control signal is applied to the grid of triode 2. Bearing in mind that the desired result is to control the magnitude and direction of current flow in load 1 at a fairly high level in response to the magnitude and polarity of the control voltage applied to the grid of triode 2, the device functions as follows: The control voltage applied to the grid of triode 2 results in the application to the grids of triodes 9 and 10 of equal and opposite potentials of a magnitude proportional to the control voltage. Four-hundred cycle power is applied to neon tubes 33 and 34 through capacitances 35 and 36, with the result that by the differentiating action of capacitances 31 and 32 there is applied periodically to the grids of triodes 9 and 10 sharp synchronizing pulses. Triodes 9 and 11 and triodes 10 and 12—each pair comprising a delay multivibrator—conduct alternately. Assuming for the moment that triode 12 is conducting and that triode 10 is not conducting, capacitance 45 is charged due to the flow of grid current in triode 12. A potential proportional to the input control voltage to triode 2 appears upon the grid of triode 10. When the next sharp synchronizing pulse furnished through capacitance 31 is applied to the grid of triode 10 the potential of the grid of triode 10 is raised until triode 10 conducts. When triode 10 conducts, the potential of the cathodes of both triodes 10 and 12 drops, as shown in Fig. 2. The grid of triode 12 immediately drops, cutting off conduction of triode 12. Capacitance 45 immediately commences discharging, with the result that the potential of the grid of triode 12 rises until triode 12 commences conducting. When triode 12 conducts, the cathodes are raised above cutoff for triode 10 so that conduction of triode 10 immediately ceases. The point at which triode 12 commences conducting and thereby causes triode 10 to cease conducting is determined by the potential of the grid of triode 10, since the potential on the grid of triode 10 affects the drop in potential of the plate of triode 10, and hence through capacitance 45, the potential of the grid of triode 12. By varying the potential on the grid of triode 10 in response to the D.-C. control signal upon the grid of triode 2, the point in time at which triode 12 commences conducting and triode 10 ceases conducting may be varied. Since the potential appearing upon the grid of triode 9 is equal and opposite to that appearing on the grid of triode 10, a similar action occurs in connection with triodes 9 and 11 as occurs in connection with triodes 10 and 12. It will be noted that the 400 cycle power applied to neon tubes 33 and 34 is 180° out of phase, so that if the midpoint between two successive synchronizing pulses is taken as a datum, the delay in the initiation of conduction of triode 12 is matched by a corresponding advance in the time of conduction of triode 11. The plates of triodes 11 and 12 are connected through capacitances 52 and 53 to primary windings 48 and 49 of transformers 50 and 51, and to ground. The secondaries of these transformers are in turn connected to the grids of thyratrons 54 and 55 through capacitances 56 and 57. The output of the pulse width multivibrators of which triodes 9, 10, 11, and 12 are parts are in the form of square waves with sharp leading and trailing edges. Square wave triggering pulses are therefore applied to the grids of the thyratrons at all times. The plates of the thyratrons, however, receive straight 400 cycle sine wave power, and the normal tendency of these thyratrons, connected as they are to mutually out-of-phase 400 cycle power, would be for them to act as grid controlled rectifiers. In other words, with a constant potential applied to each of the grids of these thyratrons—said potential being above cutoff—the thyratrons would fire each cycle, but the time of initiation of firing would be left somewhat uncertain because of the nature of the thyratrons. However, in accordance with this invention, the grids of the thyratrons are not maintained at a constant potential but at a potential which has the form of a square wave. The plates of thyratrons 54 and 55 are supplied with alternating current which is 180° out of phase. The grids of these thyratrons are supplied with a square wave potential which initiates conduction of the thyratrons at a point in time which is controlled by the control signal applied to the grid of triode 2.

Figure 3:
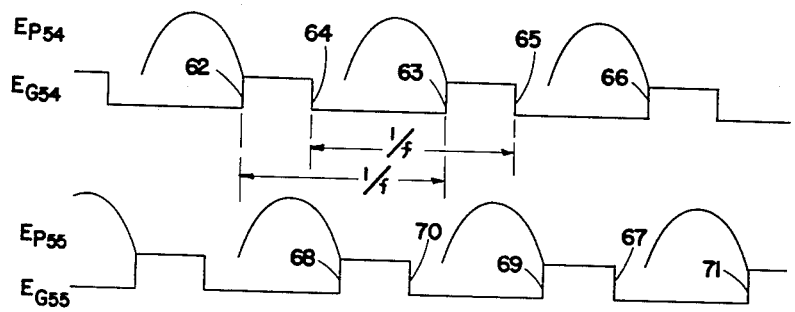
Figure 4:
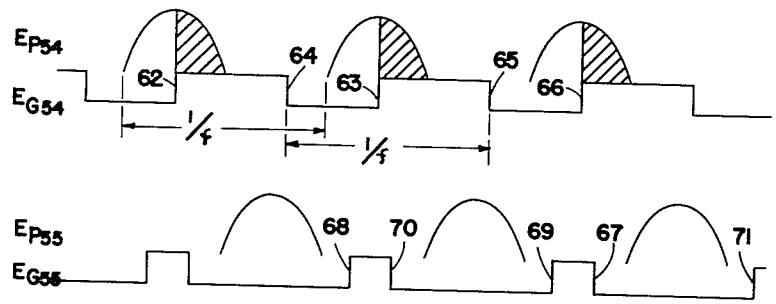
Figure 5:
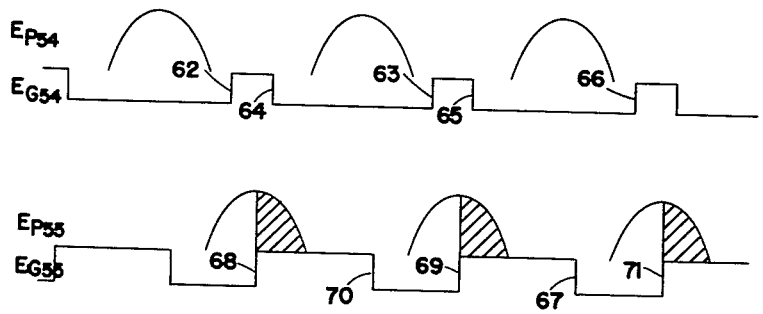

A more complete understanding of the functioning of the pulse width multivibrators of which triodes 9, 10, 11, and 12 are parts, and of the operation of thyratrons 54 and 55 may be attained by reference to Figs. 2, 3, 4, and 5, which are graphs showing potentials on various circuit components. Referring to Fig. 2, there is shown a plot of voltage against time during various phases of the operation of the pulse width multivibrator of which triodes 10 and 12 are a part. At the beginning of the cycle under consideration let it be assumed that triode 12 is conducting. If triode 12 is conducting, the plate of triode 12 is at a potential considerably reduced from B, as shown in Fig. 2. Since triode 10 is not conducting, its plate is at a potential equal to B. The grid of triode 10 is at a voltage corresponding to the input voltage to triode 2, and for any one cycle it may be assumed to be constant. The grid of triode 12, since capacitance 45 is charged and since triode 12 is conducting, is at a potential above that of the cathodes of the two tubes. This condition is reflected at the extreme left in Fig. 2. The next synchronizing pulse from capacitance 31, however, drives the grid of triode 10 temporarily above the potential of the cathodes so that triode 10 commences conduction. As soon as triode 10 conducts, the potential of the grid of triode 12 is lowered since now a relatively large current is supplied to the plate of triode 10. Capacitance 45 immediately commences discharging, gradually raising the potential of the grid of triode 12. When the grid of triode 12 reaches a predetermined potential, triode 12 begins conducting, with the result that the cathodes are driven above cutoff for the grid of triode 10. Triode 10 is therefore prevented from conducting. Now, by varying the potential upon the grid of triode 10 in response to the control signal applied to the grid of triode 2, the time at which triode 12 is caused to conduct and triode 10 is caused to cease conducting may be varied. The result of this variation and its bearing upon the functioning of thyratrons 54 and 55 is shown in Figs. 3, 4, and 5, which are a plot of grid and plate voltages of the thyratrons for zero control signal upon the grid of triode 2; for a positive control signal upon the grid of triode 2; and for a negative control signal upon the grid of triode 2.

In Figs. 3, 4, and 5 the point in time at which conduction of triode 11 commences and conduction of triode 9 ceases is shown by vertical lines 62, 63, and 66; while the points in time at which conduction of triode 9 is initiated by reception of a pulse from capacitance 32 are shown by vertical lines 64 and 65. Similarly, the points in time when triode 12 commences conduction and triode 10 ceases conduction are shown by vertical lines 68, 69, and 71; while the initiation of conduction of triode 10 occurs in time at lines 67 and 70.

In Fig. 3, the plates of thyratrons 54 and 55 go positive alternately, but since during all the time during which these plates are positive the corresponding grids are negative, the thyratrons are positively prevented from conducting and no current is supplied to the load. However, referring now to Fig. 4, when a positive control signal is applied to the grid of triode 2, lines 62, 63, and 66 are advanced in time so that the grid of thyratron 54 is not allowed to conduct until the grid thereof is suddenly driven positive, as shown at lines 62, 63, and 66. This provides a positive firing point for the thyratron and absolutely prevents conduction therethrough except when the grid is positive, since the grid is otherwise driven so far negative as to prevent conduction. Meanwhile, thyratron 55 is prevented from conducting because the grid is driven positive only during times when the plate of thyratron 55 is negative. Therefore, load 1 is driven with a current in the downward direction in Fig. 1.

Referring now to Fig. 5, when a negative control signal is applied to the grid of triode 2 thyratron 54 does not conduct, because its grid is driven positive only during times when its plate is negative. However, thyratron 55 is allowed to conduct in the manner described in connection with the conduction of thyratron 54. Load 1 is therefore driven with a current directed upward in Fig. 1. Thus the amount of current conducted through the thyratrons is controlled by the position in time of lines 62, 63, 65, 68, 69, and 71. The direction of the current applied to the load is controlled by the polarity of the control signal applied to the grid of triode 2.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Thyratron amplifier means comprising a pair of thyratrons connected to form two half-wave grid controlled rectifiers, a pair of pulse width multivibrators each connected to supply square wave pulses to the grid of one of said thyratrons, and means responsive to the current rectified by said thyratrons and to an input control signal for controlling said multivibrators to cause said thyratrons to conduct selectively and for predetermined lengths of time.

2. Means for supplying to a load device electrical power controllable in amount and direction in response to the magnitude and polarity of an input signal comprising a pair of thyratrons connected as half-wave grid controlled rectifiers for supplying power of opposite polarity to said load, an alternating current source for furnishing alternating current to said thyratrons for rectification, a pair of delay multivibrators each connected to supply square wave pulses to the grid of one of said thyratrons, means for synchronizing said multivibrators to said source of alternating current, and means for controlling the delay of said multivibrators in response to said input signal whereby the amount and direction of current applied to said load device are functions of the magnitude and polarity of said input signal.

3. Thyratron means for applying to a load a current having a magnitude and direction responsive to the magnitude and polarity of an input control voltage comprising a source of alternating current, a pair of thyratrons connected to said source of alternating current as half wave grid controlled rectifiers, a pair of delay multivibrators each connected to supply square wave input to the grid of one of said thyratrons, means responsive to said alternating current source for supplying synchronizing pulses to said multivibrators, and means responsive to said control signal for varying the delay of said multivibrators selectively in response to the polarity of said input control signal to thereby apply to said load a current whose magnitude is a function of said input control signal and whose direction is controllable in response to the polarity of said input control signal.

4. Thyratron power amplifier means comprising a source of alternating current, a pair of thyratrons connected as half-wave grid controlled rectifiers, transformer means for applying to the anodes of said thyratrons alternating current which is 180° out of phase, a transformer having two secondary windings resistively connected to the grid and cathode of each of said thyratrons, and a pair of delay multivibrators connected to the primary windings of each of said transformers to thereby allow said thyratrons to conduct for a portion of each signal of said alternating current which is determined by said delay multivibrators.

5. A device as recited in claim 4 and further comprising input means for varying the delay in said delay multivibrators to thereby cause said thyratrons to conduct in response to said delay.

6. Thyratron power amplifier means comprising a source of alternating current, a pair of thyratrons connected as half-wave grid controlled rectifiers, transformer means for applying to the anodes of said thyratrons alternating current which is 180° out of phase, a transformer having two secondary windings resistively connected to the grid and cathode of each of said thyratrons, a pair of delay multivibrators connected to the primary windings of each of said transformers, and means for varying the delay in said delay multivibrators to thereby cause said thyratrons to conduct in response to said delay.

7. Thyratron power amplifier means comprising a source of alternating current, a pair of thyratrons connected as half-wave grid controlled rectifiers, the anode of one said thyratron being connected to one terminal of said alternating current source, the anode of the other said thyratron being connected to the other terminal of said source of alternating current, a pair of multivibrators connected to control said thyratrons, and means for varying the delay in said multivibrators to thereby cause said thyratrons to conduct for a portion of each cycle of said source of alternating current in response to said delay.

References Cited in the file of this patent
UNITED STATES PATENTS

| | | |
|---|---|---|
| 1,893,766 | Fitz Gerald | Jan. 10, 1933 |
| 2,055,208 | Rumpel | Sept. 22, 1936 |
| 2,088,490 | Slepian | July 27, 1937 |
| 2,340,875 | Gibbs | Feb. 8, 1944 |
| 2,400,599 | Reeves | May 21, 1946 |
| 2,467,765 | Mayle | Apr. 19, 1949 |
| 2,497,908 | Philpott | Feb. 21, 1950 |
| 2,503,039 | Glass | Apr. 4, 1950 |
| 2,570,651 | Demuth | Oct. 9, 1951 |
| 2,688,721 | Bixby | Sept. 7, 1954 |